United States Patent [19]

Andersson et al.

[11] Patent Number: 5,240,475
[45] Date of Patent: Aug. 31, 1993

[54] METHOD AND APPARATUS FOR THE SEPARATION OF ONE OR MORE AGENTS

[76] Inventors: Jan Andersson; Lars Nilsson, both of Blomsterslottet, S-669 00 Deje, Sweden

[21] Appl. No.: 844,601

[22] PCT Filed: Oct. 1, 1990

[86] PCT No.: PCT/SE90/00629

§ 371 Date: May 7, 1992

§ 102(e) Date: May 7, 1992

[87] PCT Pub. No.: WO91/05597

PCT Pub. Date: May 2, 1991

[30] Foreign Application Priority Data

Oct. 12, 1989 [SE] Sweden ............... 8903346

[51] Int. Cl.⁵ .................................................. B01D 53/04
[52] U.S. Cl. .......................................... 95/99; 55/269; 95/107; 96/121; 96/123
[58] Field of Search ............... 55/28, 59, 62, 74, 75, 55/179, 180, 208, 269–269, 387, 389

[56] References Cited

U.S. PATENT DOCUMENTS

| | | | |
|---|---|---|---|
| 1,418,363 | 6/1922 | Coggeshall et al. | 55/59 X |
| 2,247,594 | 7/1941 | Bayerl | 55/59 |
| 2,747,681 | 5/1956 | Schuftan et al. | 55/180 |
| 3,738,084 | 6/1973 | Simonet et al. | 55/62 X |
| 3,798,876 | 3/1974 | Kennedy | 55/59 |
| 3,850,592 | 11/1974 | Huffman | 55/62 X |
| 4,104,039 | 8/1978 | Kuri et al. | 55/62 X |
| 4,282,015 | 8/1981 | Bartoschek et al. | 55/179 |
| 4,324,564 | 4/1982 | Oliker | 55/35 X |
| 4,414,003 | 11/1983 | Blaudszun | 55/59 X |
| 4,421,532 | 12/1983 | Sacchetti et al. | 55/59 X |
| 4,479,814 | 10/1984 | Oliker | 55/180 X |
| 4,846,852 | 7/1989 | Schweitzer et al. | 55/62 X |
| 4,859,216 | 8/1989 | Fritsch | 55/62 X |
| 4,863,494 | 9/1989 | Hayes | 55/59 |
| 4,881,958 | 11/1989 | Eckardt et al. | 55/208 X |
| 4,963,168 | 10/1990 | Spencer | 55/180 |
| 5,125,935 | 6/1992 | Nakaya et al. | 55/62 X |

FOREIGN PATENT DOCUMENTS

| | | |
|---|---|---|
| 1144873 | 4/1983 | Canada . |
| 0018478 | 4/1980 | European Pat. Off. . |
| 63-020020 | 1/1988 | Japan ............... 55/59 |
| WO8801534 | 10/1988 | PCT Int'l Appl. . |
| 218974 | 5/1925 | United Kingdom . |

*Primary Examiner*—Robert Spitzer
*Attorney, Agent, or Firm*—Michael D. Bednarek

[57] ABSTRACT

Method and apparatus for separating one or more agents, specially solvents, from gases. The agent or the agents are adsorbed by an adsorbent and thereafter desorbed and separated in a condenser (18). The regeneration of the adsorbent includes two steps. In the first step the agent or the agents are separated from a part of the adsorbent by heating. In this way the concentration of the agent or the agents is increased in those parts of the adsorbent which are closest to the condenser. In a second step the remaining parts of the adsorbent are regenerated.

7 Claims, 2 Drawing Sheets

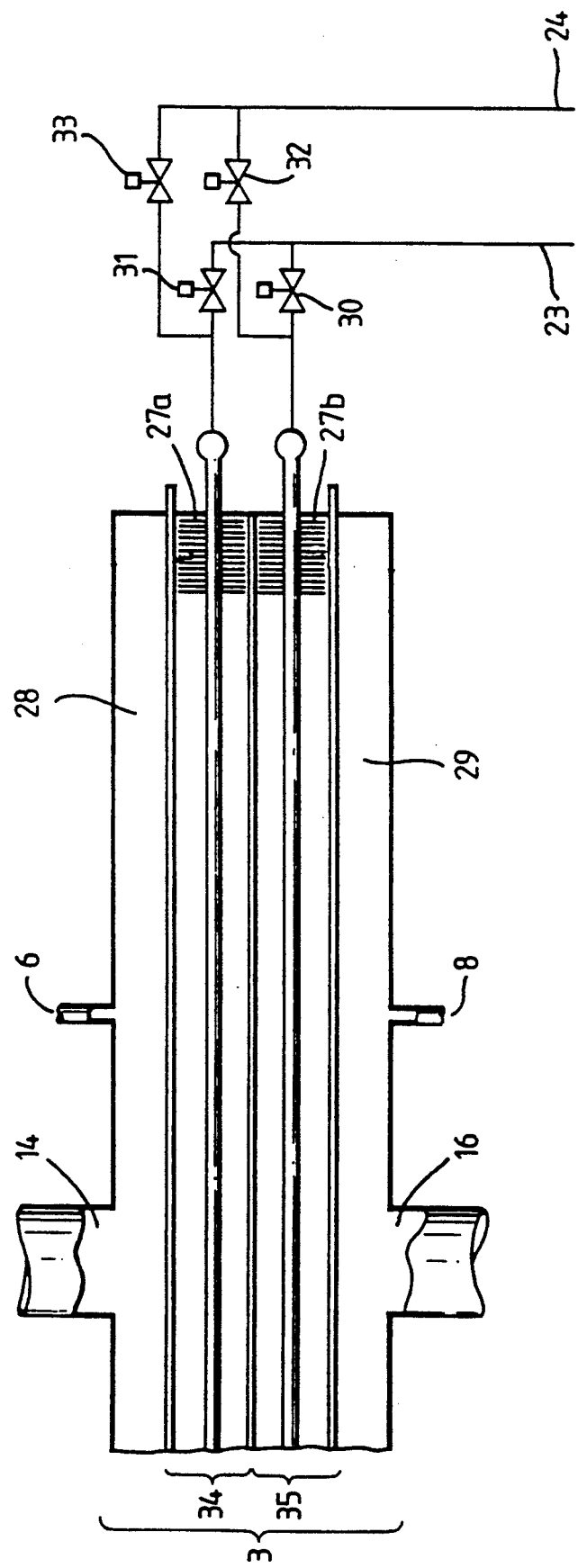

METHOD AND APPARATUS FOR THE SEPARATION OF ONE OR MORE AGENTS

TECHNICAL FIELD

The present invention relates to a method for the separation of one or more agents, specially solvents, from gases. The agent or the agents are adsorbed by an adsorbent and thereafter desorbed and separated in a condenser. The invention also includes an apparatus for carrying out the method.

BACKGROUND OF THE INVENTION AND PRIOR ART

Methods of the kind indicated in the introduction have been described in the patent specifications WO 88/01534, GB 218 974 and CA 1 144 873.

Activated carbon is generally used as an adsorbent. In connection with the regeneration of the active carbon the temperature is increased, whereby e.g. volatile solvents are volatilized. The heating can be carried out directly by means of steam injection or indirectly, in which case the heating medium does not get in touch with the adsorbent.

In connection with the volatilization by means of a stripping gas the temperature of the adsorbent does not need to reach the boiling point of the solvent due to the fact that the stripping gas reduces the partial pressure of the solvent. The volatilized solvent is separated in a condenser.

When using steam for direct heating and also using steam as a stripping gas, the condensed solvent is, however, to a high degree diluted in water. This inconvenience does not occur, if heating is carried out indirectly and if a not condensable gas as e.g. air or nitrogen is used. In this case energy consumption is also reduced due to the fact that the heat of vaporization is considerable and that there is no need to take care of more or less poluted waste water. New laws and regulations have given rise to increased demands regarding the purification of exhaust air carrying solvents as well as on the efficiency of equipment for gas purification. From the point of view of environment as well as from an economical point of view it is thus important that apparatuses and devices for purification can be made small, economical and efficient. It has also become evident that the purification of gases can be of interest and at least less expensive if the purification process is used for recovering e.g. expensive solvents.

DISCLOSURE OF THE INVENTION

The invention is based on a bed design with indirect heating using a stripping gas, and the purpose of the invention is to provide a method permitting the use of small, simple and efficient beds.

The problem has been solved using a method in connection with which the regeneration of the adsorbent includes an initial phase, during which the adsorbed agent or the adsorbed agents are separated from a part of the adsorbent and transferred to the remaining parts of the adsorbent, which remaining parts are situated closer to the condenser in the direction of flow, thus increasing the concentration of the agent or the agents in these remaining parts of the adsorbent. The remaining parts of the adsorbent are regenerated in a final phase.

An increased concentration of the agent or the agents, which are separated, is obtained in those parts of the adsorbent which in the direction of flow are situated closest to the condenser. In connection with the separation of the agent or the agents from this part of the adsorbent a much higher concentration is obtained in the stripping gas than would otherwise be the case.

This is due to the fact that the equilibrium functions for the relation between the content of solvent in the adsorbent and the content of solvent in the stripping gas, respectively, in most cases are such that an increased content in the adsorbent leads to a considerably increased content in the stripping gas. It is of considerable importance for the heat exchange in the condenser that the content of condensable components in the gas mixture, which is introduced into the condenser, is as high as possible, due to the fact that the quantity of condensed agents in the condenser increases with an increased content in the stripping gas. At the same time the quantity of not condensed agents which pass through the condenser is reduced. In order to maintain a high efficiency, exceeding 98%, the stripping gas, which has passed through the condenser, is led to the other adsorption bed, where the stripping gas is purified. If the quantity of the solvents, which are carried away with the stripping gas is small, the dimensions of the beds can be reduced. Furthermore, the bed dimensions can be reduced by using a larger flow of stripping gas, thus permitting the bed regeneration to be carried out much faster.

It has been shown that due to the increased concentration in connection with the method according to the present invention much smaller beds can be used whilst maintaining the same degree of purification.

Further characteristics and advantages of the invention will become apparent from the following description and the following claims.

BRIEF DESCRIPTION OF DRAWINGS

In the following description reference will be made to the enclosed drawings, of which FIG. 2 is an outline of an adsorption bed with two segments.

DESCRIPTION OF A PREFERRED EMBODIMENT

Figure 1:
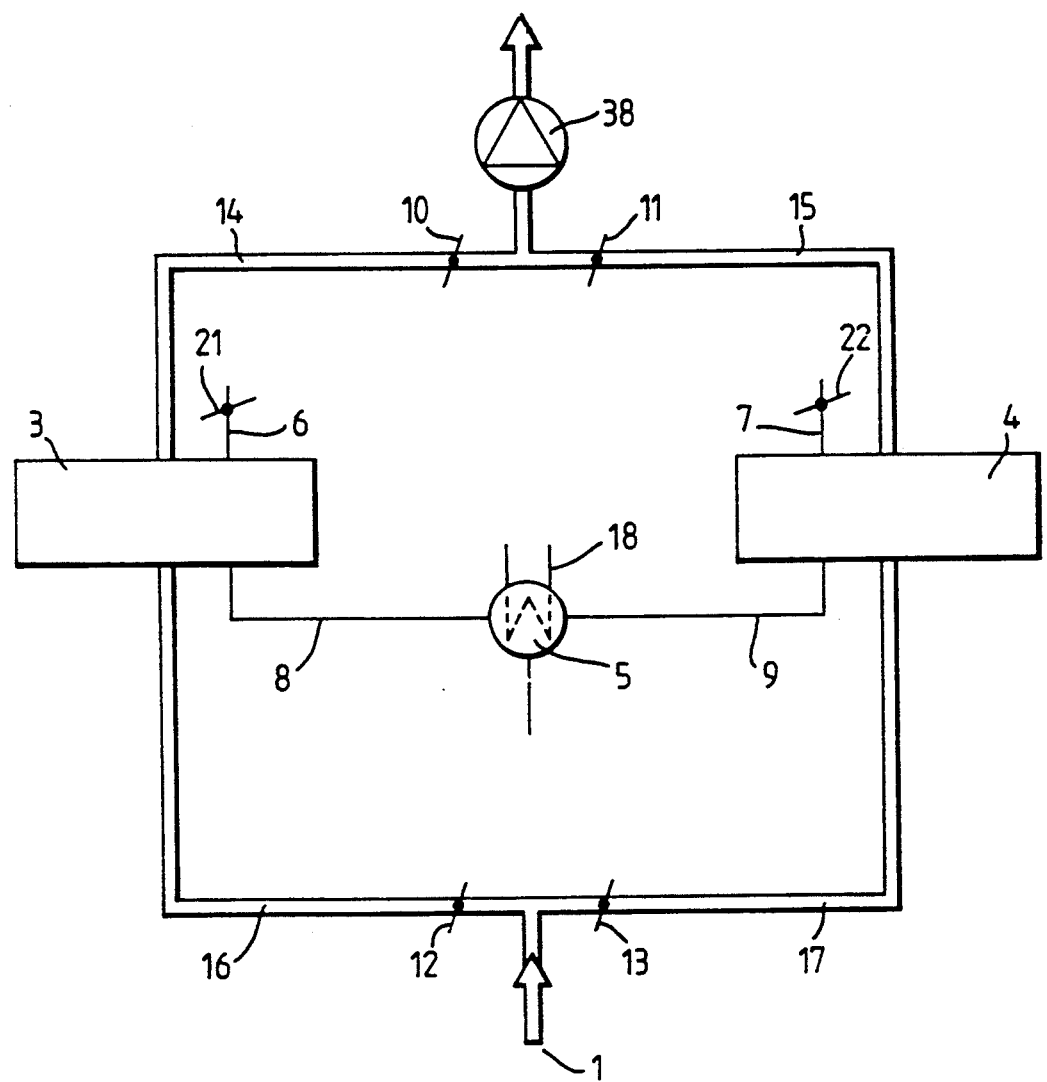
FIG. 1 is an outline showing how devices and components are interconnected to form an installation for recovery of solvents according to the method of the invention.

In FIG. 1 reference number 1 is used to designate an inlet conduit for purified air and the reference numbers 3 and 4, respectively, designate purifying beds for the purification of polluted air. A condenser, in which solvents which have polluted the air which has passed through either of the purification beds 3 or 4, is referred to by means of the reference number 5. The condenser 5 is connected to the purification bed 3 by means of the conduit 8 and connected to the purification bed 4 by means of the conduit 9.

The purification beds 3, 4 are fixed adsorption beds, which are shaped to permit a quick regeneration. The installation according to FIG. 1 operates in such a way that the purification of polluted air is carried out e.g. in the purification bed 3 whilst regeneration, i.e. removal of the solvent from the adsorbent, is carried out in the purification bed 4. When regeneration is carried out in bed 3, the air flow is connected in such a way that purification is carried out in bed 4. It is thus possible to maintain continuous operation.

The path of the air is changed automatically after a set time, when the regeneration in bed 3 is finished. After the change of the air path the purified bed works as an air purificator whilst the other bed is regenerated.

A suction ventilator 38 maintains the vacuum required to lead the air flow in the desired direction.

The reference number 18 refers to the conduit which provides water to the condenser 5.

The alteration of the air path is carried out by means of damper valves 10, 11, 12 and 13. The dampers 10 and 11 are placed in the conduits 14 and 15, respectively each of which connects one of the beds 3, 4 with the outlet conduit for purified air. The dampers 12 and 13 are placed in the conduits 16 and 17, respectively, each of which connects the inlet conduit for polluted air with one of the beds 3, 4.

During regeneration at least a part of the beds 3 or 4 are heated causing adsorbed solvent which previously has been separated from the polluted air to volatilize. Stripping gas, which is provided to the bed 3 by means of a conduit 6 and to the bed 4 by means of a conduit 7, is used to lead the solvent in the direction towards the condenser. The flow of stripping gas can be regulated or shut off by means of dampers 21 and 22 in the conduits 6 and 7, respectively. When the bed 3 purifies the air from the inlet conduit 1, the adsorbent is regenerated in bed 4. In this connection stripping gas is led from the bed 4 to the condenser through a conduit 9. The not condensable parts of the stripping gas from the bed 4 is led from the condenser to the bed 3 through a conduit 8. When the bed 4 is set to purify the air, the stripping gas is instead led from bed 3 to the condenser 5 through a conduit 8 and not condensable components of the stripping gas are led from the condenser to bed 4 through the conduit 9.

FIG. 2 shows how the purification beds 3, 4 are built up. These purification beds include an intake box 29 for polluted air, two bed segments 34, 35 and an outlet box 28 for purified air. The boxes 29, 28 function as inlet or outlet boxes, respectively, only when the bed is functioning as a cleaner, implying that the dampers 10, 12 are open and that the damper 21 is shut. During the regeneration phase when solvent is removed from the adsorbent, stripping gas is provided to the box 28 through the conduit 6. The stripping gas is led to the condenser through the box 29 and the conduit 8.

Each one of the bed segments 34, 35 includes a heat exchanger including a number of finned tubes 27a and 27b, respectively. The finned tubes 27a, b can be heated by means of steam or cooled using cooling water. The heating medium or the cooling medium is supplied through the conduits 23, 24 and controlled by means of valves 30, 31, 32, 33. The space between the finned tubes 27a, b and the space between the fins is filled with an adsorbent, e.g. activated carbon. Also other adsorbents can be used, such as e.g. zeolite material and adsorbing polymers.

During purification polluted air is led into the bed through the conduit 16. The polluted air will thereafter pass through the box 29 and the bed segments 34, 35, which are filled with adsorbents causing the impurities to be adsorbed by the adsorbent and thus purified air is withdrawn from the segment 34 to the box 28 and led to the outlet conduit 14.

The purification phase is ended after a predetermined time, which is set with regard to the size of the installation, the degree of pollution in the air and the quantity of air.

During the regeneration phase the air flow from conduit 16 to conduit 14 is shut and stripping gas is provided to the box 28 through the conduit 6. The air may thereafter pass through the bed segments 34 and 35 as well as through the box 29 and the conduit 8, wherefrom it is led to the condenser.

During the purification phase the bed segments may be cooled in order to obtain an efficient purification of the air provided to the bed segments. When heating the bed the result will be the opposite—the solvent will volatilize and the bed will give off solvent. Solvent is drawn by suction to the condenser and the damper in the conduit 6 is opened to avoid the building up of vacuum in the bed.

In connection with the regeneration according to the present invention at first only the bed segment 34 is heated whilst the other segment is cooled. The bed segment 35 will thus adsorb the impurities, i.e. the solvents, which during the previous purification phase have been collected in the segment 34. A considerable concentration of solvent will thus build up successively in the segment 35. When this concentration has reached a certain level, the segment 35 is heated. Thus the solvent is given off to the condenser in high concentration.

The condenser 5 will thus receive stripping gas with a high content of condensable agents, which in the present case consist of solvents. The efficiency of the condenser is considerably increased when the content of not condensable gas is reduced. The increase of concentration of solvents in the part of the bed which is closest to the condenser will thus be accompanied by a considerable increase in capacity of the installation.

Depending on the degree of pollution and the properties of the agent or the agents, which should be removed or recovered, it might be convenient to use more than a pair of beds. Furthermore, the number of segments in each bed can be increased.

Also other modifications of the described embodiment than those mentioned above are possible without any deviation from the general principles of the invention and without exceeding the scope of the following claims.

In a test installation with one purification bed built up according to FIG. 2 exemplifying experiments have been carried out separating solvents from a gas. The purification bed had the outer form of a rectangular parallelepiped with the dimensions 1.5 m × 1 m × 0.3 m. The purification bed was divided into two bed segments 34, 35. The bed segment 34 had the height of 0.2 m and the bed segment 35 the height of 0.1 m. Each of the bed segments included a heat exchanger of stainless steel with a specific heat surface of 0.7 $m^2$/kg carbon.

The cooling area of the condenser amounted to 2.5 $m^2$.

The flow of cooling water to the condenser was constant in connection with all experiments and amounted to 0.5 $m^3$/h.

EXAMPLE 1

Without concentration

Adsorption:
| | |
|---|---|
| Air 1000 $m^3$/h during 8 h | |
| Solvent content | 2 g/$m^3$ |
| Solvent quantity | 16 kg |

-continued

| Solvent: | |
|---|---|
| Ethanol | 40% |
| Butyl alcohol | 5% |
| Butyl acetate | 40% |
| Ethylene glyco acetate | 5% |
| Xylene | 10% |
| Desorption: | |
| The whole bed was heated to | 110° C. |
| Condenser temperature | +10° C. |
| Time of desorption | 2.5 h |
| Quantity condensed | 8.5 kg |
| Quantity passing the condenser (not condensed) | 7.5 kg |
| Condensation | 53% |

EXAMPLE 2

With concentration

| Adsorption and solvent according to Example 1 | |
|---|---|
| Desorption: | |
| a) Heating of one half of the bed to and cooling of the other half with water during 1 h | 110° C. |
| b) Heating of both halves of the bed to during 1.5 h | 100° C. |
| Time of desorption | 2.5 h |
| Condenser temperature | +10° C. |
| Condensation | 13.5 kg |
| Quantity passing the condenser (not condensed) | 2.5 kg |
| Condensation | 84% |

EXAMPLE 3

Without concentration

| Adsorption: | |
|---|---|
| Air 1000 m³/h during 8 h | |
| Solvent content | 1.6 g/m³ |
| Solvent quantity | 12.8 kg |
| Solvent: | |
| Xylene | 60% |
| Butyl alcohol | 15% |
| Butyl acetate | 5% |
| Ethylene glyco acetate | 10% |
| Aromatic hydrocarbons | 10% |
| Desorption: | |
| The whole bed was heated to | 120° C. |
| Condenser temperature | +18° C. |
| Time of desorption | 2.5 h |
| Quantity condensed | 7.2 kg |
| Quantity passing the condenser (not condensed) | 5.6 kg |
| Condensation | 56% |

EXAMPLE 4

With concentration

| Adsorption and solvent according to Example 3 | |
|---|---|
| Desorption: | |
| a) Heating of one half of the bed to and cooling of the other half with water during 1 h | 120° C. |
| b) Heating of both halves of the bed to during 1.5 h | 115° C. |
| Time of desorption | 2.5 h |
| Condenser temperature | +18° C. |
| Condensation | 11.5 kg |
| Quantity passing the condenser (not condensed) | 1.3 kg |
| Condensation | 90% |

We claim:

1. Method for the separation of an agent from gases, said agent being adsorbed by an adsorbent and thereafter desorbed from the adsorbent and separated in a condenser characterized in that the adsorbent, in connection with the desorbtion of the agent from the adsorbent is successively heated in such a way as to create a heating front which moves stepwise or continuously through the adsorbent from the part of the adsorbent which in the direction of flow is farthest off from the condenser in direction to the condenser, and that those parts of the adsorbent which are situated ahead of said heating front are cooled, which causes the concentration of the agent to increase in the parts of the adsorbent situated ahead of the heating front and causes said agent to be given off in the condenser in high concentration.

2. Method according to claim 1, characterized in that stripping gas intended to carry desorbed agents is supplied to the adsorbent during the separation and led from the parts of the adsorbent which are in the direction of flow farthest off from the condenser to the condenser.

3. Method according to claim 1, characterized in that the adsorbent is divided into two or more adsorbing units, which units alternatively are exposed to either gas from which an agent or agents shall be removed or to stripping gas intended to remove desorbed agents, and that at least one unit always adsorbs and one unit desorbs.

4. Apparatus for separating an agent from gases, the apparatus comprising at least two units containing an adsorbent which units are arranged to be exposed alternatively to either a gas, from which an agent or several agents should be separated, or to stripping gas intended to carry desorbed agent or desorbed agents to a condenser for separation, characterized in that the adsorbent in each of said units is divided into at least two segments each segment being equipped with means for separate heating and cooling arranged to first heat the bed segment which in the flow direction is farthest off from the condenser while the other segment is cooled.

5. Apparatus according to claim 4, characterized in that the means for cooling and heating consist of heat exchangers with finned conduits for cooling or heating media flowing therefrom, the conduits being embedded in the adsorbent.

6. Apparatus according to claim 4, characterized in that the condenser is connected by means of conduits with each one of the units which contain the adsorbent, the conduits being provided with control means which lead stripping gas which has not been condensed to at least one unit in which adsorption is being carried out.

7. Apparatus according to anyone of the claims 4-6, characterized in that the adsorbent is activated carbon, zeolite material or an adsorbing polymer.

* * * * *